United States Patent [19]

Wells

[11] Patent Number: 4,996,651
[45] Date of Patent: Feb. 26, 1991

[54] CUTTING INSTRUMENT IMPROVEMENT FOR X-Y PLOTTER

[76] Inventor: William L. Wells, 1208 Fleming Rd., Cordele, Ga. 31015

[21] Appl. No.: 454,980

[22] Filed: Dec. 22, 1989

[51] Int. Cl.$^5$ .............................................. G06F 15/00
[52] U.S. Cl. ...................... 364/520; 364/518
[58] Field of Search ................ 364/518-523; 346/140 R, 139 R

[56] References Cited

U.S. PATENT DOCUMENTS

| | | | |
|---|---|---|---|
| 3,942,411 | 3/1976 | Gerber | 364/520 |
| 4,367,588 | 1/1983 | Herbert | 364/520 |
| 4,467,525 | 8/1984 | Logan et al. | 364/520 |
| 4,654,956 | 4/1987 | Reed et al. | 364/520 |
| 4,686,540 | 8/1987 | Leslie et al. | 364/520 |
| 4,794,408 | 12/1988 | Niemeyer | 364/520 |

*Primary Examiner*—Arthur G. Evans
*Attorney, Agent, or Firm*—Cushman, Darby & Cushman

[57] ABSTRACT

A cutting instrument improvement for a computer controlled X-Y plotter comprising an electric motor having a housing and a rotor mounted for rotation about an axis fixed with respect to the housing at a relatively high speed in response to the connection of the motor with a source of electric current. An annular member is mounted on the motor housing for cooperating with the instrument receiving and holding mechanism to enable the latter to hold the housing in fixed centered relation on the instrument carrying member of the plotter for controlled movement with the instrument carrying member into an inoperative position and biased movement with the instrument carrying member into an operative position. A cutting tool is detachably fixed to the rotor for rotation therewith and has a sharp point disposed on the rotational axis when the instrument carrying member is in the operative position for relative X and Y axis movements with respect to a laminated sheet received and controlled by the laminated sheet receiving and controlling mechanism of the plotter. An adjustable spring assembly preferably containing the opposed springs, acts between the housing and the carriage to resiliently support a selected portion of the weight of the motor and tool on the carriage.

29 Claims, 2 Drawing Sheets

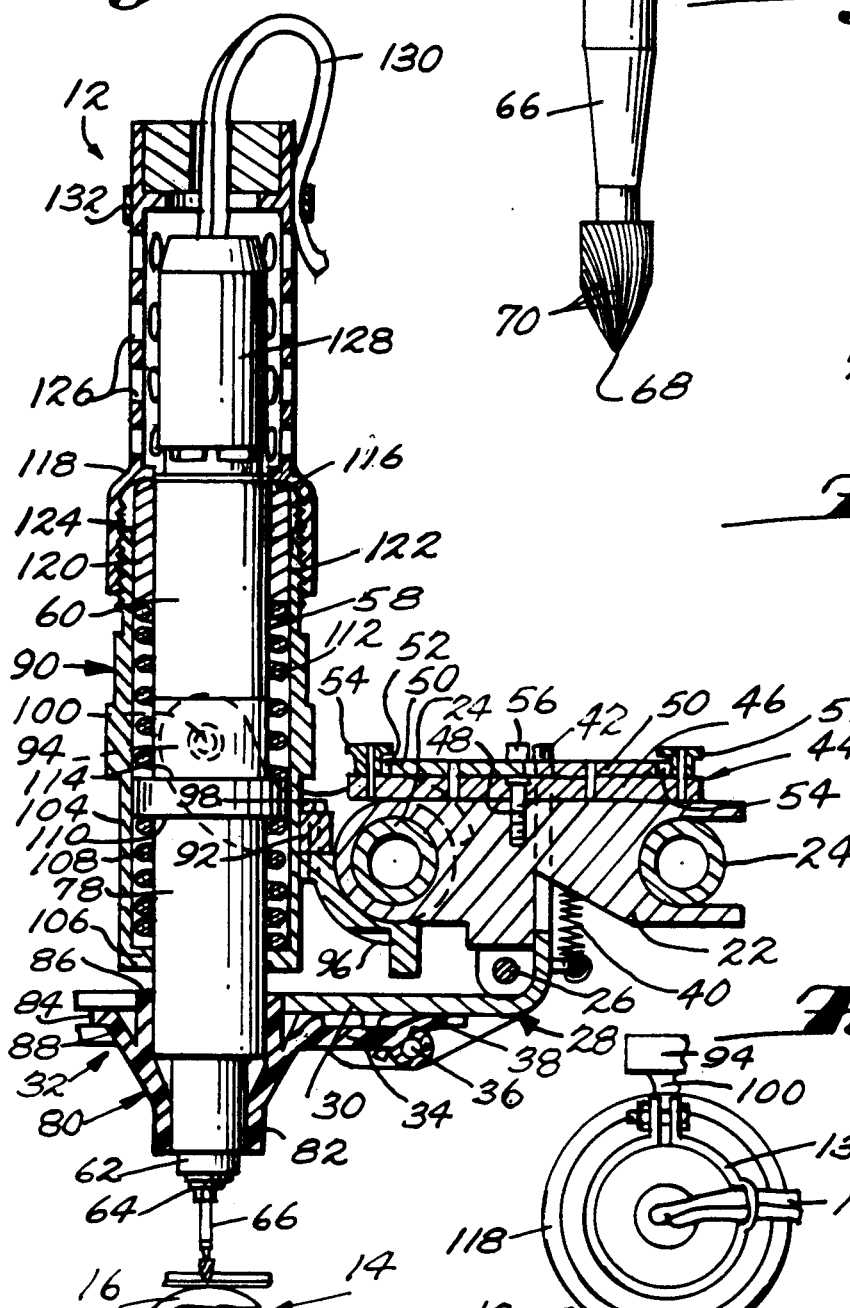
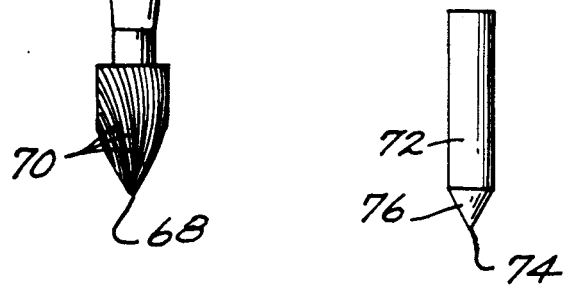
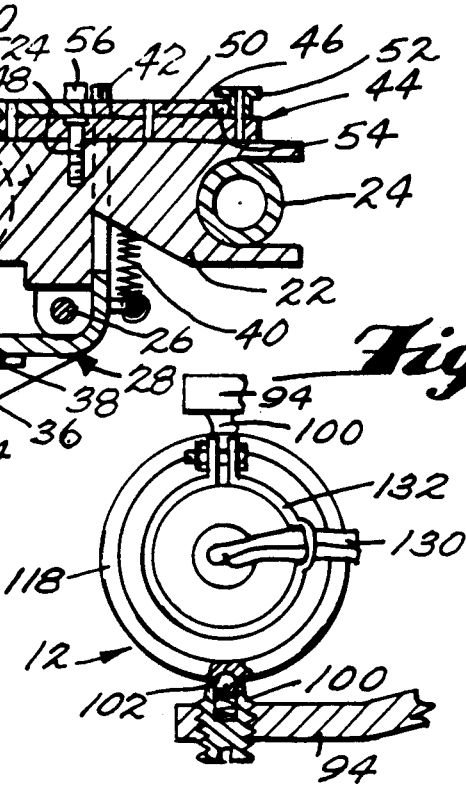

CUTTING INSTRUMENT IMPROVEMENT FOR X-Y PLOTTER

This invention relates to the cutting of display sheet material and, more particularly, to improvements in cutting mechanisms utilized with computer operated X-Y plotters.

X-Y plotters are well known and are available commercially in a variety of models. There are basically two types of plotters. In both types, the instrument which is used to work on the sheet material is carried by an instrument carrying member which is mounted on a carriage for movement between operative and inoperative positions. One type of plotter has a fixed bed which receives and controls the sheet material in a fixed position and the carriage is mounted for movement both along an X axis and a Y axis. In the second type of plotter, the sheet material is moved along the X axis and the carriage is moved only along the Y axis. Heretofore, the plotters used in cutting display sheet material have been the movable sheet type for the reason that many signs such as banners and the like have an elongated dimension in one direction.

U.S. Pat. No. 4,467,525 discloses a computer operated X-Y plotter specifically designed for the purpose of cutting display material. The apparatus of the patent, which is called an automatic sign generator, includes a computer operated X-Y plotter of the movable sheet type which is provided with a cutting instrument for cutting a layer of display material adhered to a layer of release material. One example of this type of material utilizes a layer of vinyl display material which has an adhesive on one surface which is adhered to a surface of the layer of release material. In the operation of the sign generator, a display arrangement is cut in the layer of vinyl material. After the vinyl material has been cut, the laminated sheet is weeded by removing the portions of the display material which are extraneous to the display. A transfer sheet having an adhesive surface is then adhered to the free surface of the cut display material allowing the vinyl display material to be peeled from the release material with the transfer sheet by virtue of the greater gripping ability of the adhesive of the transfer material. The adhesive side of the vinyl material is then adhered to the display support utilizing the adhesive side of the vinyl material to effect adherence. This securement is greater than the securement between the adhesive of the transfer sheet and the opposite surface of the vinyl so that the transfer sheet is easily stripped from the vinyl display material. In another laminated sheet embodiment, the display material is in the form of a plastisol layer which is adhered to the release material. In this embodiment, the design is cut in the plastisol display material in mirror image form. After the cut, the display material is weeded to leave the mirror image design on the release layer. The display material is then placed on the display backing and heat transferred thereto as by an iron or the like.

There have been various cutting mechanisms proposed for use in the X-Y plotters to effect the cutting of the layer of display material. The aforesaid patent discloses several embodiments of cutting mechanisms which are utilized to effect the cutting of the vinyl layer. One cutting mechanism is characterized as a hot tip stylus. This mechanism embodies a sharp pointed instrument which is capable of being heated. The combination of the sharp point and the heat affects the cutting action when there is relative movement between the heated stylus and the sheet material. Another cutting mechanism disclosed in the aforesaid patent is a trailing knife. This mechanism includes a knife blade which includes a sharp point and a cutting edge leading to the sharp point. The cutting point is offset from the axis of the blade and the blade is carried by the instrument carrying member for free rotational movement about its axis. Thus, the cutting blade acts in a more or less caster wheel fashion. In a third embodiment, the blade is reoriented so that its point is along its axis and a positive motion transmitting mechanism is provided for orienting the edge of the blade in the direction of movement with respect to the sheet. The patent indicates that the blade embodiments are particularly desirable for making large signs because the machine can be operated at a higher rate of speed than is possible with the hot stylus cutting mechanism. On the other hand, the trailing blade does not provide great accuracy and the orientable blade requires additional movement affecting means and an additional computer signal for accurate operation. There exists a need for a cutting instrument which secures the advantages of the prior art cutting instruments while eliminating the disadvantages thereof. Stated differently, there exists a need for a cutter which can be operated in the simplistic manner of a hot stylus without the inaccuracy or complication of the blade type cutters while, at the same time, being capable of operating at speeds greater than the hot stylus cutting mechanism.

It is an object of the present invention to fulfill the above-described need. In accordance with the principles of the present invention, this objective is obtained by providing a cutting mechanism improvement for a computer controlled X-Y plotter either of the fixed sheet or movable sheet type, the cutting mechanism improvement comprising an electric motor having a housing and a rotor mounted within the housing for rotation about an axis fixed with respect to the housing at a relatively high speed in response to the connection of the motor with the source of electric current. A connecting element is mounted on the motor housing for cooperating with the instrument receiving and holding mechanism on the instrument carrying member of the plotter so as to enable the latter to hold the motor housing in fixed centered relation on the instrument carrying member for controlled movement with the instrument carrying member into an operative position thereof and biased movement with the instrument carrying member into an operative position thereof. A cutting tool is detachably fixed to the rotor for rotation therewith and has a sharp point disposed on the rotational axis when the instrument carrying member is in the operative position for relative X and Y axis movements with respect to a laminated sheet received and controlled by the laminating sheet receiving and controlling mechanism of the plotter. An adjustable spring mechanism acts between the motor housing and the carriage for resiliently supporting a selected portion of the weight of the electric motor and cutting tool on the carriage in such a way as to (1) accommodate the controlled movement of the electric motor and cutting tool with the instrument carrying member into the inoperative position thereof and (2) facilitate the biased movement of said electric motor and cutting tool with the instrument carrying member into the operative position thereof so as to enable the cutting tool to cut the layer of display material during relative X and Y axis movements relative thereto without severing the layer of release material.

Preferably, the adjustable spring mechanism includes a support having a clamp for fixedly securing the support on the carriage, thus rendering the cutting mechanism suitable to be attached as a self-contained instrument assembly on existing plotters with the connecting element on the motor housing modified to interengage with the instrument holding mechanism on the instrument carrying member of the plotter. Accordingly, it is a further object of the present invention to provide a cutting instrument assembly of the type described for use with a computer controlled X-Y plotter for cutting a layer of display material adhered to a layer of release material.

Preferably, the adjustable spring assembly includes opposed springs for biasing the electric motor and cutting tool in opposite directions and an adjustment for varying the net biasing effect of the opposed springs so as to enable the assembly to accommodate other cutting requirements useful with other sheet-like workpieces. Accordingly, a further object of the present invention is the provision of a cutting instrument improvement of the type described having an opposed spring mount and adjusting mechanism for the purposes specified.

Still another object of the present invention is the provision of a cutting instrument improvement which is simple in construction, effective in operation and economical to manufacture and maintain.

These and other objects of the present invention will become more apparent during the course of the following detailed description and appended claims.

The invention may best be understood with reference to the accompanying drawings wherein an illustrative embodiment is shown.

IN THE DRAWINGS

FIG. 2 is an enlarged fragmentary sectional view taken along the line 2—2 of FIG. 1;

FIG. 3 is a fragmentary top plan view with parts in section of the cutting instrument improvement shown in FIG. 2;

FIG. 4 is an enlarged side elevational view of a cutting tool shown in FIG. 2; and FIG. 5 is a view similar to FIG. 4 showing another cutting tool which can be used in lieu of the cutting tool of FIG. 4.

Figure 1:
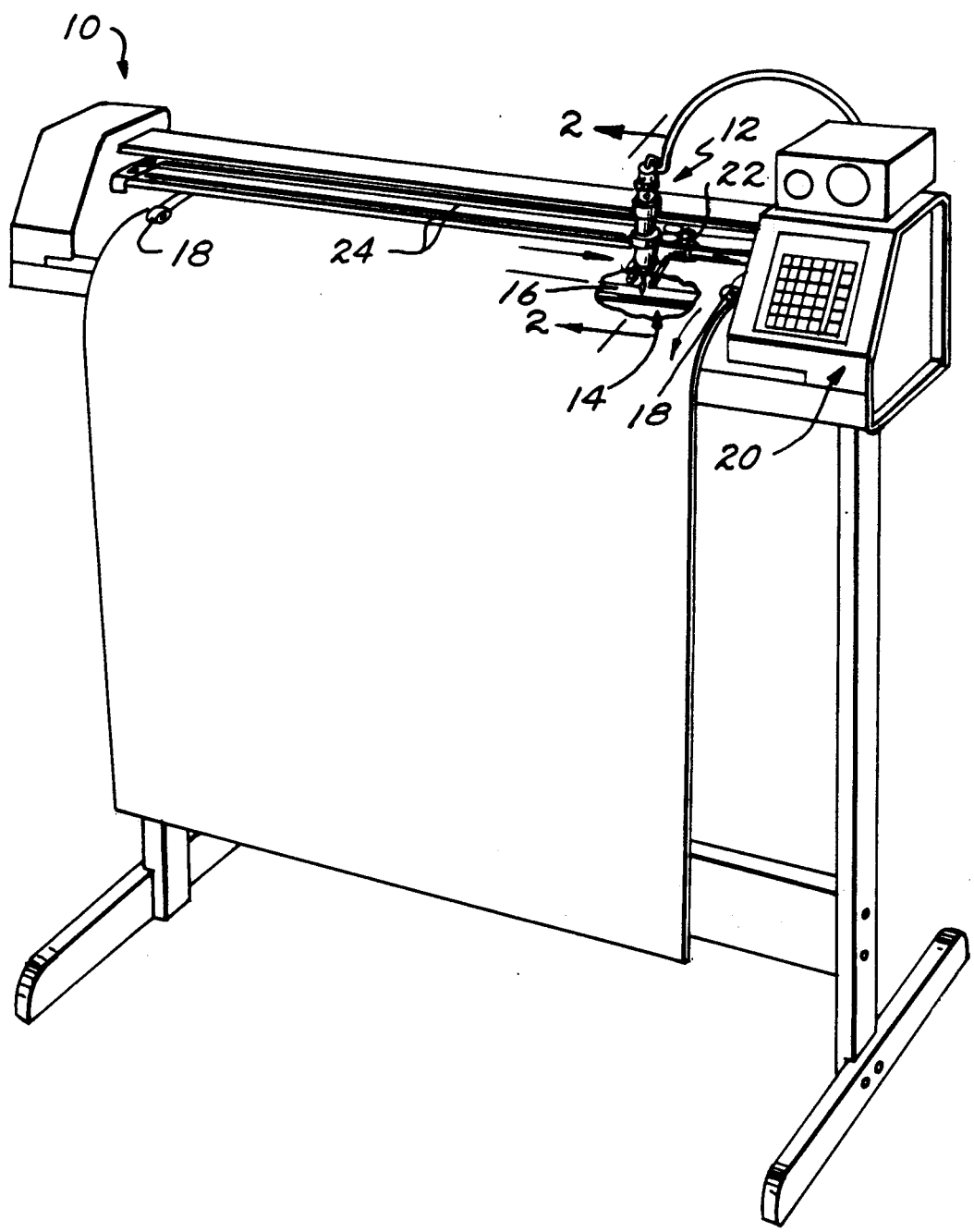
FIG. 1 is a perspective view of an X-Y plotter including the improvement or cutting assembly of the present invention.

Referring now more particularly to the drawings, there is shown in FIG. 1 thereof a computer operated and controlled X-Y plotter having the cutting instrument or assembly improvement of the present invention embodied therein. In FIG. 1, the computer controlled X-Y plotter is designated generally by the numeral 10 and cutting instrument improvement of the present invention is generally indicated by the numeral 12. The plotter 10 may be of any known configuration, the exemplary embodiment shown in FIG. 1 being Model LP 3700, manufactured by Ioline Corporation. It will be understood that other types of plotters may be utilized, as, for example, the plotter disclosed in the aforesaid U.S. Pat. No. 4,467,525, the disclosure of which is hereby incorporated by reference into the present specification for background purposes.

It will be understood that the exemplary plotter 10 shown in FIG. 1 is of the movable sheet type which includes a sheet receiving and controlling mechanism, generally indicated at 14, having a roller 16 mounted for rotation beneath the sheet material to be worked on with idler rollers 18 pressing the sheet material down onto the roller so as to effect movement of the sheet material along an X axis in response to a computer control, generally indicated at 20, which controls a rotational mechanism for the roller 16 to advance and retract the sheet material. The plotter 10 also includes a carriage 22 which is mounted for movement along a Y axis, as by a pair of rods 24, mounted on the frame of the plotter 10. Here again, the carriage 22 is moved along the guide rods 24 to effect Y axis movements with respect to the sheet material by a moving mechanism under the control of the computer control 20.

As best shown in FIG. 2, in the particular embodiment shown, the carriage 22 has mounted thereon, as by a pivot pin 26, an instrument carrying member, generally indicated at 28, which is in the form of an L-shaped lever including end walls for receiving the pivot pin 26. The instrument carrying member 28 includes a forwardly extending arm portion 30 which is bifurcated at its outer end. The bifurcation forms a part of an instrument receiving and holding mechanism, generally indicated at 32, which also includes a bifurcated member 34 having one end apertured to receive a pivot pin 36 which extends through depending wall portions on the instrument carrying member arm portion 30. A hair pin spring 38 is operatively associated with the arm portion 30 and bifurcated member 34 so as to resiliently bias the bifurcated member 34 in a clockwise direction as viewed in FIG. 2. The instrument carrying member 28 is biased to pivot about its pivot pin connection 26 with the carriage 22 in a counterclockwise direction as viewed in FIG. 2 into an operative position, as shown. The weight of the member 28 and the instrument carried thereby provide a portion of the bias while the remaining portion is provided by a tension spring 40 connected at one end to a rearward extension on an upper arm portion 42 of the member 28 and to the carriage 22.

The instrument carrying member 28 is moved from its operative position shown in a clockwise direction, as viewed in FIG. 2, into an inoperative position under the control of the computer control 20. As shown, a mechanism, generally indicated at 44, for effecting controlled movements of the instrument carrying member 28 into its inoperative position includes a T-shaped lever 46 pivoted at its central juncture to the carriage 22 as by a pivot pin 48 and carrying on opposite ends of the cross of the T a pair of meshing gears 50 and rollers 52 for retaining elongated rack elements 54 in engagement with the periphery of the opposite meshing gears 50. The stem of the T-shaped lever 46 includes an upwardly extending element 56 which is positioned to engage the upper end of the lever arm portion 42 when the T-shaped lever 44 is pivoted in response to the computer control 20 to effect the movement of the instrument carrying member into its inoperative position. The meshing gear arrangement enables the elongated racks 54 to effect pivotal movement of the T-shaped lever in any position of movement of the carriage 22 along the rods 24 or Y axis.

The cutting instrument improvement 12 of the present invention includes an electric motor, generally indicated at 58, having a housing 60 and a rotor assembly 62 mounted within the housing 60 for rotational movement about a fixed rotational axis. The rotor assembly 62 extends outwardly from the housing 60 and includes a chuck mechanism 64 for detachably fixedly receiving therein a cutting tool. Preferably, the electric motor is a relatively high speed motor with precision bearings. An exemplary embodiment is the electric motor manufactured and sold by Chiyoda Dental Co., Ltd. of Japan under the trademark HAND ENGINE Model HE-38L2 and HE-40L. The electric motor is operated on an input voltage of 30 volts DC and operates at 35,000 rpm at maximum speed. The weight exclusive of the electric cord is approximately 250 grams.

As shown in FIG. 2, the chuck mechanism 64 of the rotor assembly 62 has a burr type cutting tool 66 with a sharp point 68 fixed therein. As shown, the burr includes a series of flutes 70 with the burr having a point portion which diverges toward the point 68 at an included angle of 60 degrees or somewhat less than 60 degrees.

In FIG. 5, there is illustrated another embodiment of a cutting tool 72 which can be utilized. The cutting tool 72 includes a point 74 along the rotational axis and a point portion which diverges thereto at an included angle of approximately 60° and forms an exterior smooth conical surface 76 without cutting flutes, such as shown in the tool of FIG. 4.

In accordance with the principles of the present invention, the motor housing 60 includes at its forward portion a section 78 which is rotatably mounted to engage and disengage the chuck mechanism 64 from the cutting tool 66 or 72. The forward end of this tubular section 78 is of reduced diameter so as to fixedly receive an annular member, generally indicated at 80, which is configured to be engaged within the instrument receiving and holding mechanism 32 of the instrument carrying member 28. As shown, the annular member 80 includes a lower portion 82 which is fixed to the lower end of the housing section 78 and an annular flange 84 with an upwardly extending tubular portion 86. The exterior surface of the tubular portion 86 and the upper surface of the flange 84 are adapted to engage the bifurcated portion of the instrument carrying member arm portion to determine a central fixed relationship between the two. The surface below the flange 84 is a frustoconical surface 88 which is adapted to be engaged by the bifurcated member 34 to resiliently affix the annular member 80 in its centered relation with respect to the bifurcated portion of the arm portion 30. It will be understood that the arrangement is such that the annular member 80 can be moved with the motor 58 laterally into fixed centered relationship with respect to the bifurcation of the arm portion 30 with the bifurcated member 34 serving to effect a resilient securement when the affixed centered relationship has been established. Stated differently, the annular member 80 is capable of being snapped into and out of fixed centered relation with respect to the instrument carrying member 28.

The cutting instrument improvement 12 also includes an adjustable spring mechanism, generally indicated at 90, for supporting a portion of the weight of the electric motor 56, cutting tool 66 or 72 and annular member 80 on the carriage 22. To this end, there is provided a support member 92 which includes a curved forward portion for engaging a curved portion of the carriage 22 and a pair of rearwardly extending arms 94. The support member 92 is fixedly secured to the carriage 22 by a cooperating clamp member 96 which engages the opposite cylindrical portion of the carriage and is clamped thereto, as by bolts 98 or the like.

Threadedly mounted within the free ends of the support arms 94 is a pair of spring biased ball assemblies 100. The ball assemblies 100 are adapted to snap into engagement within depressions 102 formed in the exterior periphery of a first tubular spring mounting member 104. As shown, the tubular mounting member 104 is disposed in spaced surrounding relation to the elongated exterior periphery of the motor housing 60 and includes an inwardly directed flange 106 on its lower end defining an annular surface for operatively engaging one end of a first helical compression spring 108. The spring 108 is disposed within the space between the interior periphery of the spring mounting member 104 and the exterior periphery of the motor housing 60 and has its upper end operatively engaged with an annular surface 110 on the exterior periphery of the motor housing 60 which faces toward the cutting tool 66 or 72. The arrangement is such that the helical compression spring 108 serves to resiliently urge the electric motor 58 in a direction away from the cutting tool.

While it is within the contemplation of the present invention to provide a single spring, such as the spring 104, which supports a portion of the weight of the electric motor on the carriage, it is preferable because of the stability added to provide a second helical coil spring 112 which acts in an opposed direction to move the electric motor 58 in a direction toward the cutting tool. As shown, the motor housing 60 includes an annular surface 114 which faces away from the cutting tool which operatively engages one end of the second coil spring 112. The opposite end of the second coiled spring 112 is operatively connected with an annular surface 116 formed interiorly on a second tubular mounting member 118 through a sleeve 120.

As shown, the second tubular spring mounting member 118 includes a lower end portion of enlarged diameter which is internally threaded as indicated at 122 for threadedly engaging exterior threads 124 formed on the upper end of the first tubular member 104. A portion of the tubular member 118 which extends above the annular surface 116 is preferably apertured, as indicated at 126, to provide cooling air for an electrical connector 128 therein which serves to connect a source of DC current to the electrical motor 58 through an electrical wire 130. The electrical wire 130 extends upwardly through the upper end of the second tubular member 118 and is looped around and fixed to the member 118 as by a clamp 132 or the like. The clamp 132 serves to prevent any forces acting through the wire 130 to be transmitted to the motor housing 60, the force being taken up by the mounting member 118 and support 92 to the carriage 22 by virtue of the clamp arrangement. It will be understood that the electrical wire can be connected with any suitable source of DC current, a typical source being an AC to DC converter plugged into an AC line.

It can be seen that by turning the upper tubular member 118 with respect to the lower tubular member 104, the relative axial position of the operative spring engaging surfaces 116 and 114 can be varied to vary the stress of the second spring 112 which, in turn, will vary the stress of the first spring 108. The arrangement is such that the second spring 112 is of lesser strength than the first spring so that the net effect of the two springs 112 and 108 is to support a portion of the weight of the electric motor 58, cutting tool 66 or 72, and annular member 80 from the carriage 22. The arrangement is such that the sleeve 120 slides between the interior periphery of the tubular member 104 and the exterior periphery of the motor housing 60, thus stabilizing the motor housing 60 laterally with respect to the tubular member 104. The arrangement is such that the ball connections 102 of the spring pressed ball assemblies 100 of the support 92, enable the two interconnected tubular spring mounting members 104 and 118 to be pivoted about the common axis of the two ball assemblies 100 so as to accommodate the tilting action of the motor housing 60 that occurs when the instrument carrying member 28 is pivoted from the operative position, as shown in FIG. 2, in a counterclockwise direction into an inoperative position wherein the cutting tool 66 or 72 is spaced from the sheet material mounted on the roller 16. The resiliency of the connection between the annular member 80 with the instrument receiving and holding mechanism 32 as aforesaid further accommodates the canting movement of the motor housing 60 as the instrument carrying member 28 is moved into its inoperative position. It will be understood that other arrangements for accommodating the relative movement can be utilized which would still provide for a degree of lateral stability for the upper portion of the electrical motor housing 60. For example, the springs could be helical spiral springs rather than simple helical springs with the springs serving to laterally position the housing within the tubular members while permitting some biased canting therein when the instrument carrying member is moved into its inoperative position.

The adjustment provided by the turning of the second tubular member 118 with respect to the first tubular member 104 enables the biased movement of the instrument carrying member 28 into its operative position to carry with it the electric motor 58 so that the bias on the cutting tool 66 or 72 is such that the point 68 or 74 will penetrate through the layer of display material, such as vinyl or plastisol, but will not penetrate through the layer of release material, which is a form of paper.

As indicated, both of the cutting tools 66 or 72, as shown in FIGS. 4 and 5, have been utilized to successfully cut both vinyl and plastisol display materials without penetrating through the release material layer of the laminated sheet being worked on. Since the point 68 or 74 of the cutting tool 66 or 72 is aligned with the axis of rotation, the conventional plotter signals can be utilized and it is not necessary to provide either a signal to rotationally orient the cutting tool or a mechanism to effect the rotational orientation in response to the signal as is the case with an orientable cutting blade such as disclosed in the aforesaid U.S. Pat. No. 4,467,525.

The spring pressed ball connection between the support 92 and the spring mounting member 104 is desirable in conjunction with the resilient mount for the annular member 80. Thus, both connections are capable of being snapped into engagement and snapped out of engagement enabling the cutting instrument assembly 12 of the present invention to be easily replaced by a conventional pen. Simple replacement of the present cutting instrument with a pen is desirable to provide a rapid written proof of the efficacy of the program prior to effecting the cutting operation.

It will be understood that, while the present invention is particularly suited for cutting display material from a laminated sheet, the motor can be utilized to provide a cut for other sheet material utilizing other cutting tools.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. In a computer controlled X-Y plotter including means for detachably receiving and controlling a laminated sheet including a layer of display material adhered to a layer of release material, an instrument carrying member having means for detachably receiving and holding an instrument thereon in fixed centered relation, a carriage having means for mounting said instrument carrying member thereon (1) for biased movement into an operative position wherein an instrument received and held in fixed centered relation by said instrument receiving and holding means is disposed in operative relation with a laminated sheet received and controlled by said laminated sheet receiving and controlling means and (2) for controlled movement from said operative position against the bias thereof into an inoperative position wherein an instrument received and held by said instrument receiving and holding means is disposed in spaced relation with a laminated sheet received and controlled by said laminated sheet receiving and controlling means, and means for mounting said laminated sheet receiving and controlling means and said carriage for relative movements with respect to each other such that relative movements along both an X axis and a Y axis can be effected between an instrument received and held in fixed centered relation by said instrument receiving and holding means and a laminated sheet received and controlled by said sheet receiving and controlling means with the instrument carrying member either in an operative or inoperative position, the improvement which comprises an electric motor having a housing, a rotor mounted in said housing for rotation about an axis fixed with respect to said housing at a relatively high speed in response to the connection of said motor with a source of electric current, means on said motor housing for cooperating with said instrument receiving and holding means to enable the latter to hold said motor housing in fixed centered relation on said instrument carrying member for controlled movement with said instrument carrying member into said inoperative position and biased movement with said instrument carrying member into said operative position, a cutting tool detachably fixed to said rotor for rotation therewith and having a sharp point disposed on said rotational axis when said instrument carrying member is in said operative position for relative X and Y axis movements with respect to a laminated sheet received and controlled by said laminated sheet receiving and controlling means, and adjustable spring means acting between said motor housing and said carriage for resiliently supporting a selected portion of the weight of said electric motor and cutting tool on said carriage in such a way as to accommodate the controlled movement of said electric motor and cutting tool with said instrument carrying member into said inoperative position and (2) facilitate the biased movement of said electric motor and cutting tool with said instrument carrying member into said operative position so as to enable said cutting tool to cut the layer of display material during relative X and Y axis movements without severing the layer of release material.

2. The improvement as defined in claim 1 wherein said motor housing includes an elongated exterior annular periphery having a first annular spring receiving surface facing in a direction toward said cutting tool, said adjustable spring means including a first helical compression spring disposed in surrounding relation to said motor housing and having one end operatively engaged with respect to said first annular spring receiving surface and a first tubular spring mounting member disposed in surrounding relation with said first spring and having an annular surface facing in a direction away from said cutting tool operatively engaging an opposite end of said first spring.

3. The improvement as defined in claim 2 wherein said adjustable spring means includes a support having means for fixedly securing the same to said carriage and means for connecting said support with said first tubular spring mounting member.

4. The improvement as defined in claim 3 wherein said motor housing includes a second annular spring receiving surface facing in a direction away from said cutting tool, said adjustable spring means including a second helical compression spring disposed in surrounding relation to said motor housing and having one end operatively engaging said second annular spring receiving surface and a second tubular spring mounting member having an annular surface facing in a direction toward said cutting tool operatively engaging an opposite end of said second spring and means for threadedly mounting said second tubular spring mounting member so that by turning said first tubular member with respect to said second tubular member said first tubular member can be moved into a selected one of a multiplicity of different positions with respect to said second tubular member to thereby adjust the relative bias of said springs on said motor housing.

5. The improvement as defined in claim 4 wherein said means for connecting said support with said first tubular member comprises a pair of opposed spring pressed ball assemblies mounted on said support and a pair of diametrically opposed ball receiving depressions formed in an exterior periphery of said first tubular member so as to enable the connection (1) to be resiliently effected by simply moving the periphery of said first tubular member between said spring pressed ball assemblies until the latter enter said depressions and (2) to be resiliently disengaged by a simple moving the periphery of said first tubular member from between said spring pressed ball assemblies.

6. The improvement as defined in claim 5 wherein said instrument receiving and holding means includes a first bifurcated portion on said instrument carrying member a second bifurcated member mounted for resiliently biased movement toward said first bifurcated portion, said means on said motor housing for cooperating with said instrument receiving and holding means including an annular member mounted in surrounding relation with an exterior peripheral portion of said motor housing, aid annular member including first surfaces for engagement by said bifurcated portion to determine the fixed center relationship and second surfaces for engagement by said bifurcated member to resiliently retain said first surfaces in engagement with said bifurcated portion.

7. The improvement as defined in claim 6 wherein said cutting tool includes a point portion diverging toward said point at an acute included angle.

8. The improvement as defined in claim 7 wherein said included angle is approximately 60°.

9. The improvement as defined in claim 8 wherein said point portion has cutting flutes formed therein.

10. The improvement as defined in claim 8 wherein said point portion has a smooth conical exterior surface.

11. The improvement as defined in claim 1 wherein said adjustable spring means includes opposed springs biasing said electric motor and cutting tool in opposite directions and means for varying the net biasing effect of said opposed springs.

12. The improvement as defined in claim 11 wherein said adjustable spring means includes a support fixed to said carriage, a spring mounting member and a snap-in snap-out connection between said support and said spring mounting member, said means on said motor housing cooperating with said instrument receiving and holding means providing a snap-in snap-out connection between said motor housing and said instrument carrying member.

13. The improvement as defined in claim 1 wherein said adjustable spring means includes a support fixed to said carriage, a spring mounting member and a snap-in snap-out connection between said support and said spring mounting member, said means on said motor housing cooperating with said instrument receiving and holding means providing a snap-in snap-out connection between said motor housing and said instrument carrying member.

14. The improvement as defined in claim 1 wherein said cutting tool includes a point portion diverging toward said point at an acute included angle.

15. The improvement as defined in claim 14 wherein said included angle is approximately 60°.

16. The improvement as defined in claim 15 wherein said point portion has cutting flutes formed therein.

17. The improvement as defined in claim 15 wherein said point portion has a smooth conical exterior surface.

18. A display material cutting assembly for use with a computer controlled X-Y plotter of the type including means for detachably receiving and controlling a laminated sheet including a layer of display material adhered to a layer of release material, an instrument carrying member having means for detachably receiving and holding an instrument thereon in fixed centered relation, a carriage having means for mounting said instrument carrying member thereon (1) for biased movement into an operative position wherein an instrument received and held in fixed centered relation by said instrument receiving and holding means is disposed in operative relation with a laminated sheet received and controlled by said laminated sheet receiving and controlling means and (2) for controlled movement from said operative position against the bias thereof into an inoperative position wherein an instrument received and held by said instrument receiving and holding means is disposed in spaced relation with a laminated sheet received and controlled by said laminated sheet receiving and controlling means, and means for mounting said laminated sheet receiving and controlling means and said carriage for relative movements with respect to each other such that relative movements along both an X axis and a Y axis can be effected between an instrument received and held in fixed centered relation by said instrument receiving and holding means and a laminated sheet received and controlled by said sheet receiving and controlling means with the instrument carrying member either in an operative or inoperative position, said display material cutting mechanism comprising an electric motor having a housing, a rotor mounted in said housing for rotation about an axis fixed with respect to said housing at a relatively high speed in response to the connection of said motor with a source of electric current, means on said motor housing for cooperating with the instrument receiving and holding means to enable the latter to hold said motor housing in fixed centered relation on said instrument carrying member for controlled movement with said instrument carrying member into said inoperative position and biased movement with said instrument carrying member into said operative position, a cutting tool detachably fixed to said rotor for rotation therewith and having a sharp point disposed on said rotational axis when said instrument carrying member is in said operative position for relative X and Y axis movements with respect to a laminated sheet received and controlled by said laminated sheet receiving and controlling means, and a support having means for fixedly securing the same to said carriage, adjustable spring means acting between said motor housing and said support for resiliently supporting a selected portion of the weight of said electric motor and cutting tool on said carriage without preventing said electric motor and cutting tool from controlled movement with said instrument carrying member into said inoperative position and biased movement with said instrument carrying member into said operative position so as to enable said cutting tool to cut the layer of display material during relative X and Y axis movements without severing the layer of release material.

19. A display material cutting mechanism as defined in claim 18 wherein said adjustable spring means includes opposed springs biasing said electric motor and cutting tool in opposite directions and means for varying the net biasing effect of said opposed springs.

20. A display material cutting mechanism as defined in claim 19 wherein said adjustable spring means includes a spring mounting member and a snap-in snap-out connection between said support and said spring mounting member, said means on said motor housing cooperating with the instrument receiving and holding means providing a snap-in snap-out connection between said motor housing and the instrument carrying member.

21. A display material cutting mechanism as defined in claim 18 wherein said adjustable spring means includes a spring mounting member and a snap-in snap-out connection between said support and said spring mounting member, said means on said motor housing cooperating with the instrument receiving and holding means providing a snap-in snap-out connection between said motor housing and the instrument carrying member.

22. A display material cutting mechanism as defined in claim 18 wherein said cutting tool includes a point portion diverging toward said point at an acute included angle.

23. A display material cutting mechanism as defined in claim 22 wherein said included angle is approximately 60°.

24. A display material cutting mechanism as defined in claim 23 wherein said point portion has cutting flutes formed therein.

25. A display material cutting mechanism as defined in claim 24 wherein said point portion has a smooth conical exterior surface.

26. In a computer controlled X-Y plotter including means for detachably receiving and controlling a sheet-like workpiece, an instrument carrying member having means for detachably receiving and holding an instrument thereon in fixed centered relation, a carriage having means for mounting said instrument carrying member thereon (1) for biased movement into an operative position wherein an instrument received and held in fixed centered relation by said instrument receiving and holding means is disposed in operative relation with a sheet-like workpiece received and controlled by said workpiece receiving and controlling means and (2) for controlled movement from said operative position against the bias thereof into an inoperative position wherein an instrument received and held by said instrument receiving and holding means is disposed in spaced relation with a sheet-like workpiece received and controlled by said workpiece receiving and controlling means, and means for mounting said workpiece receiving and controlling means and said carriage for relative movements with respect to each other such that relative movements along both an X axis and a Y axis can be effected between an instrument received and held in fixed centered relation by said instrument receiving and holding means and a sheet-like workpiece received and controlled by said workpiece receiving and controlling means with the instrument carrying member either in an operative or inoperative position, the improvement which comprises an electric motor having a housing, a rotor mounted in said housing for rotation about an axis fixed with respect to said housing at a relatively high speed in response to the connection of said motor with a source of electric current, means on said motor housing for cooperating with said instrument receiving and holding means to enable the latter to hold said motor housing in fixed centered relation on said instrument carrying member for controlled movement with said instrument carrying member into said inoperative position and biased movement with said instrument carrying member into said operative position, said rotor including chuck means for detachably receiving a cutting tool for rotation therewith about said rotational axis when said instrument carrying member is in said operative position for relative X and Y axis movements with respect to a workpiece received and controlled by said laminated sheet receiving and controlling means, and adjustable spring means acting between said motor housing and said carriage for resiliently supporting said electric motor on said carriage in such a way as to (1) accommodate the controlled movement of said electric motor with said instrument carrying member into said inoperative position and (2) facilitate the biased movement of said electric motor with said instrument carrying member into said operative position, said adjustable spring means including opposed springs biasing said electric motor in opposite directions and means for varying the net biasing effect of said opposed springs so as to enable the biased movement of said electric motor with said instrument carrying member into said operative position to maintain the desired depth of cut of the workpiece for the cutting tool mounted in said chuck means.

27. The improvement as defined in claim 26 wherein said adjustable spring means includes a support fixed to said carriage, a spring mounting member and a snap-in snap-out connection between said support and said spring mounting member, said means on said motor housing cooperating with the instrument receiving and holding means providing a snap-in snap-out connection between said motor housing and the instrument carrying member.

28. A sheet-like workpiece cutting assembly for use with a computer controlled X-Y plotter of the type including means for detachably receiving and controlling a sheet-like workpiece, an instrument carrying member having means for detachably receiving and holding an instrument thereon in fixed centered relation, a carriage having means for mounting said instrument carrying member thereon (1) for biased movement into an operative position wherein an instrument received and held in fixed centered relation by said instrument receiving and holding means is disposed in operative relation with a sheet-like workpiece received and controlled by said sheet-like workpiece receiving and controlling means and (2) for controlled movement from said operative position against the bias thereof into an inoperative position wherein an instrument received and held by said instrument receiving and holding means is disposed in spaced relation with a sheet-like workpiece received and controlled by said workpiece receiving and controlling means, and means for mounting said workpiece receiving and controlling means and said carriage for relative movements with respect to each other such that relative movements along both an X axis and a Y axis can be effected between an instrument received and held in fixed centered relation by said instrument receiving and holding means and a sheet-like workpiece received and controlled by said workpiece receiving and controlling means with the instrument carrying member either in an operative or inoperative position, said sheet-like workpiece cutting mechanism comprising an electric motor having a housing, a rotor mounted in said housing for rotation about an axis fixed with respect to said housing at a relatively high speed in response to the carrying member into said inoperative position and biased movement with said instrument carrying member into said operative position, a cutting tool detachably fixed to said rotor for rotation therewith and having a sharp point disposed on said rotational axis when said instrument carrying member is in said operative position for relative X and Y axis movements with respect to a laminated sheet received and controlled by said laminated sheet receiving and controlling means, and a support having means for fixedly securing the same to said carriage, adjustable spring means acting between said motor housing and said support for resiliently supporting a selected portion of the weight of said electric motor and cutting tool on said carriage without preventing said electric motor and cutting tool from controlled movement with said instrument carrying member into said inoperative position and biased movement with said instrument carrying member into said operative position so as to enable said cutting tool to cut the layer of display material during relative X and Y axis movements without severing the layer of release material.

29. A sheet-like workpiece cutting mechanism as defined in claim 28 wherein said adjustable spring means includes a spring mounting member and a snap-in snap-out connection between said support and said spring mounting member, said means on said motor housing cooperating with the instrument receiving and holding means providing a snap-in snap-out connection between said motor housing and the instrument carrying member.

* * * * *